Aug. 24, 1943.    O. R. HUGHES    2,327,645
INTERNAL COMBUSTION ENGINE
Filed Sept. 8, 1941    2 Sheets-Sheet 1
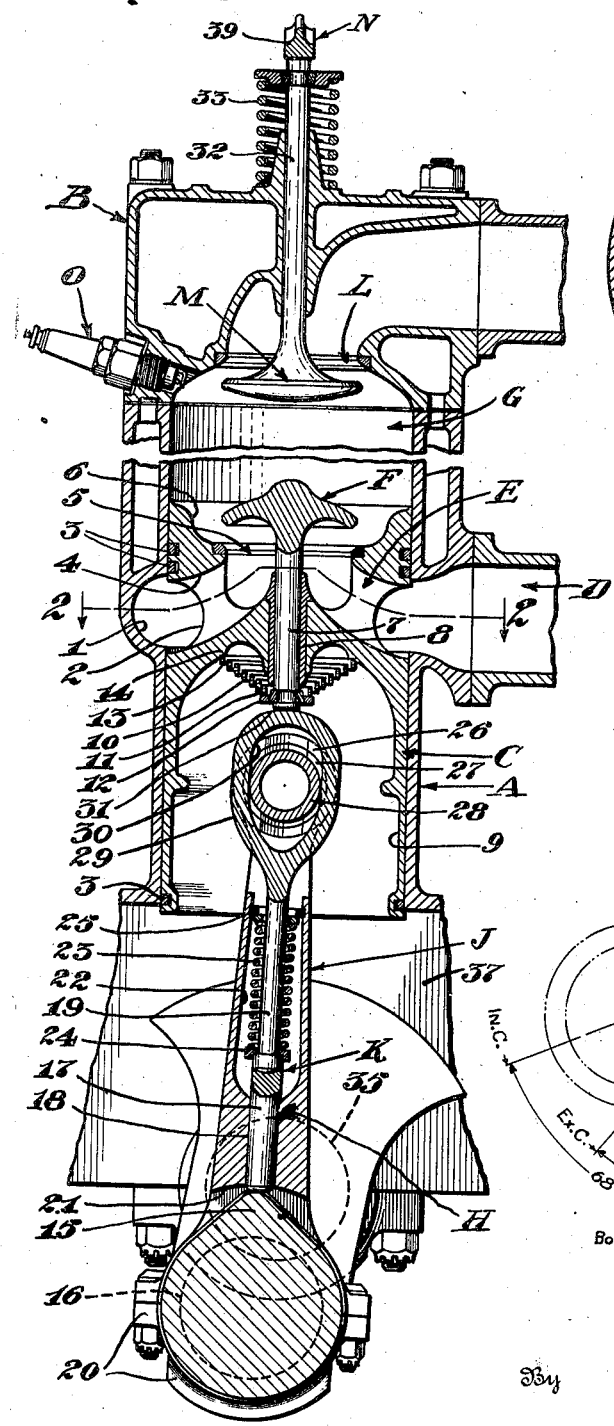
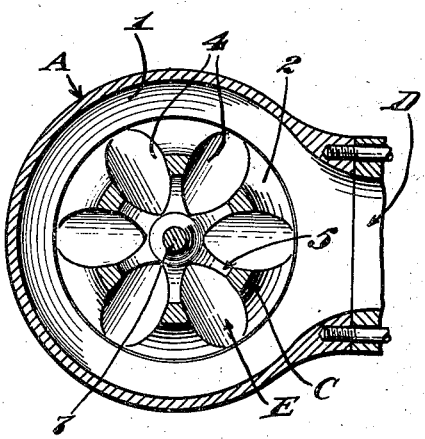
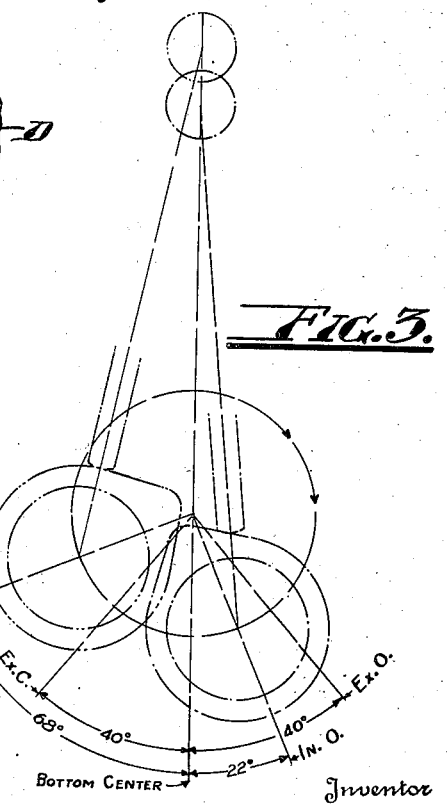
Inventor
Owen R. Hughes
By Chas. J. Chunn
Agent Aug. 24, 1943.    O. R. HUGHES    2,327,645
INTERNAL COMBUSTION ENGINE
Filed Sept. 8, 1941    2 Sheets-Sheet 2
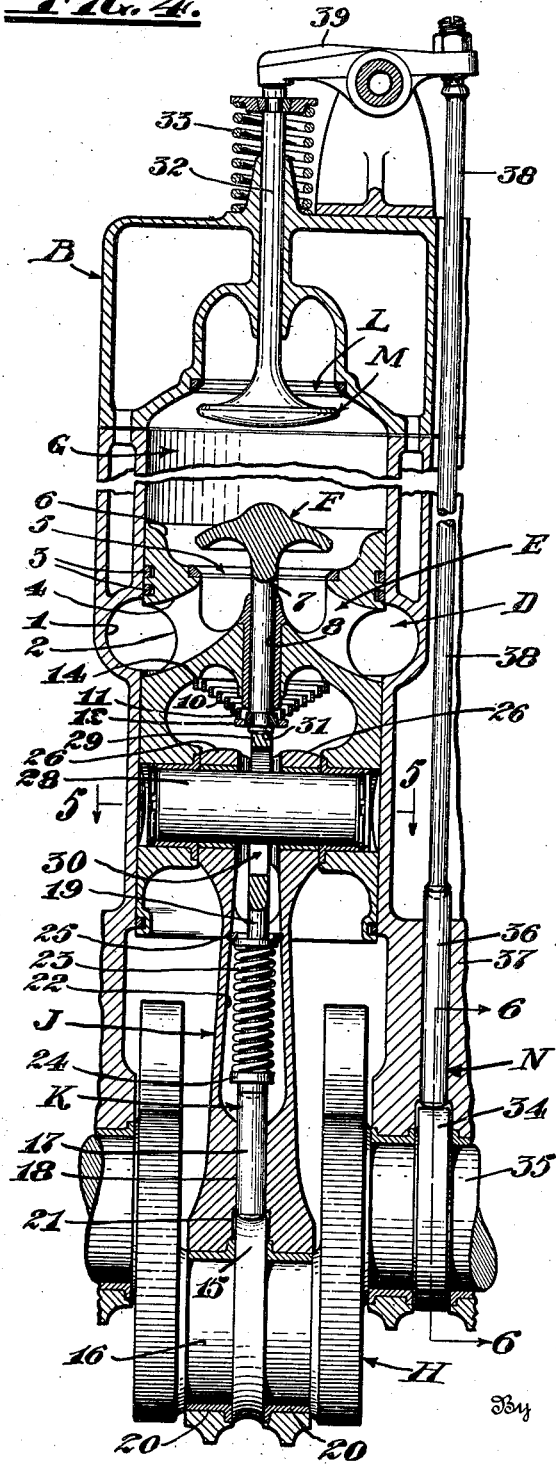
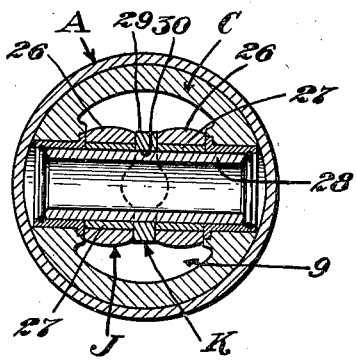
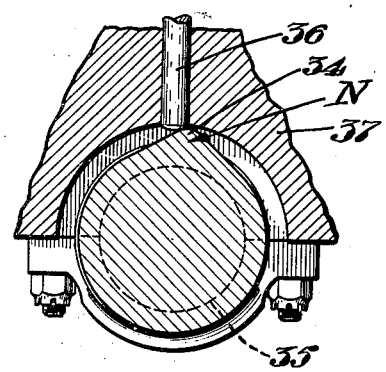
Inventor
Owen R. Hughes
By
Agent Patented Aug. 24, 1943

2,327,645

UNITED STATES PATENT OFFICE 2,327,645

INTERNAL COMBUSTION ENGINE

Owen R. Hughes, Alhambra, Calif.

Application September 8, 1941, Serial No. 410,021

20 Claims. (Cl. 123—47)

My invention has for its primary object to provide an internal combustion engine which is superior to engines of the two cycle class as heretofore known, and comparable if not superior to four cycle engines, in point of simplicity, economy and facility of construction and maintenance, as well as economy of operation, reliability of performance, power obtainable and general efficiency.

Another object of my invention is to provide a new and efficient internal combustion engine piston construction having valved means for passing combustible gas under pressure from a cylinder intake port through the piston and into the combustion chamber in such manner as to create a controlled and uniform "piston-like" mass of such gas moving uniformly within the combustion chamber without eddies, or turbulence as an effective scavenging medium and thereby insuring a thorough exhaust of spent gases and minimizing loss of the combustible charge through the exhaust port.

Another object of my invention is to provide an engine such as described wherein the intake valve in the piston and the exhaust valve in the cylinder head are so arranged and cyclically actuated as to better co-ordinate the intaking and exhausting actions and cause both cycles to be concluded in a minimum portion of each revolution of the crank shaft.

Another object of my invention is to provide an engine such as described wherein the piston carried intake valve is operated by connecting rod carried means driven by a cam on the crank shaft, while the valve in the head exhaust valve is also actuated by crank shaft driven means, all in such manner as to insure the desired cyclical action with a simple and efficient valve mechanism.

A further object of my invention is to provide in an engine such as hereinbefore described a circumferential intake duct of semi-circular across section interiorly of the cylinder for registry with a similar duct circumscribing the piston, whereby at the time of full registry of said ducts there is formed an annular intake chamber of circular cross section surrounding the piston and affording an unobstructed flow of the incoming gases under the full pressure desired into the intake ducts in the piston and out through the intake valve port into the combustion chamber, without pressure drop and in such manner as to eliminate eddies and turbulence which would detract from the desired velocity and pressure of the incoming gases and also impair the scavenging action thereof.

Yet another object is to provide in an engine of the character described an intake valve port, an intake valve and an associated piston head of such construction and relative arrangement that an annular space is formed between the valve and piston as though centered about an imaginary cylinder whose volume is equal to the difference between its volume and that of the cylindrical combustion chamber, to equalize the outward and inward thrusts of the intake gases as they are forced under pressure into the combustion chamber.

A further purpose of my invention is to provide in an engine such as described a piston-cylinder head-combustion chamber construction and arrangement in combination with concentric axially opposed intake and exhaust valve ports in the piston and cylinder head, of such form and relative arrangement as to cause a unidirectional flow of exhaust and incoming gases as well as scavenging and intaking actions which are properly co-ordinated to secure optimum scavenging without loss of the combustible charge also a more effective charging of the combustion chamber.

With the foregoing objects in view together with such other objects and advantages as may subsequently appear the invention is carried into effect as illustrated by way of example in the accompanying drawings in which:

Fig. 1 is a fragmentary vertical sectional view of an engine embodying my invention with parts omitted for clarity of illustration.

Fig. 2 is a horizontal section taken on the line 2—2 of Fig. 1:

Fig. 3 is a diagrammatic view showing an efficient valve timing and cyclical operation:

Fig. 4 is a sectional view similar to Fig. 1, and taken at right angles thereto:

Fig. 5 is a sectional view taken on the line 5—5 of Fig. 4:

Fig. 6 is a sectional view taken on the line 6—6 of Fig. 4:

Referring to the drawings more specifically it is seen that one form of two cycle engine embodying my invention may generally include a cylinder A, a cylinder head B, a piston C, an intake port D in the cylinder, intake means E and an intake poppet valve F embodied in the piston for introducing a combustible charge from the intake port D through the piston into the combustion chamber G, a crank shaft H, a connecting rod J, a crank shaft operated means K associated with the connecting rod and piston for actuating the intake valve F, an exhaust port L in the cylinder head in alignment with the intake valve F, a crank shaft actuated means N for operating the exhaust valve M and a spark plug O. As the ignition means and certain other parts of the engine form no part of the present invention and may be of any suitable conventional form, such parts except the spark plug are not shown in the accompanying drawings need not be described herewith.

In accordance with my invention the intake port D opens into an annular groove-like duct 1 of semi-circular cross section located interiorly of the cylinder for co-operation with the intake means E in the piston C.

As here shown the intake means E includes a groove-like duct 2 similar to the duct 1 and circumscribing the piston C between the piston rings 3 so that when the ducts 1 and 2 come into full register there is formed an annular intake chamber of circular cross section affording an unrestricted flow of incoming combustible charge. In this connection it should be noted that the combustible charge should be fed under pressure above atmosphere, as by means of a supercharger or other engine driven means not shown, to insure proper charging of the combustion chamber and an effective scavenging of the cylinder.

Resuming the description of the intake means E in the piston it will be observed that a plurality of radial intake ducts 4 opening at their outer ends into the annular duct 2 of the piston, are coursed upwardly so that their inner ends open into an intake valve port 5 at the top of the piston. The top of the piston is formed with a concavity 6 the walls of which have an ogee profile. The valve port 5 is in the center of the piston and said concavity and the intake valve F when fully opened extends but slightly above the plane of the upper end of the piston.

The arrangement and shapes of the intake valve port, intake valve and top of the piston are such that these parts present concentrically curved surfaces and eliminate eddies and turbulence in the incoming charge. These formations also provide an annular space consisting of a portion of the combustion chamber and said annular space is as though centered about an imaginary cylinder whose volume is equal to the difference between its volume and that of the combustion chamber. This arrangement equalizes the outward and inward thrusts of the intaking gases as they are forced around the circular intake valve F in entering the combustion chamber.

The intake valve F has its stem 7 slidably suported in a central axial bore 8 in the piston which bore opens into the wrist pin chamber 9 of said piston. Housed in the chamber 9 is a spiral spring 10 whose innermost and smallest coil 11 is axially distended and fixed to a keeper 12 on the lower end of the valve stem while the largest and outer coil 13 is engaged with a shoulder 14 on the body of the piston, the spring being tensioned so as to yieldably hold the valve seated.

As here provided the crank shaft operated means K for operating the intake valve F includes a cam 15 formed integral with or otherwise fixed on the crank pin 16 of the crank shaft H, a follower 17 engaged with the cam 15 and slidably supported in an axial bore 18 in the connecting rod J, and a push rod 19 slidably supported on the connecting rod and contacting at its ends the follower 17 and the lower end of the valve stem 7.

To accommodate the intake valve cam 15 the crank pin bearing 20 is divided as shown in Fig. 4 and the lower end of the connecting rod is bifurcated as at 21 as shown in Fig. 1 whereby the cam may contact the follower 17 extending between the furcations of the end 21 of the connecting rod.

As here shown the connecting rod has an axial bore 22 in which the lower part of the push rod 19 extends for contact with the follower 17. A helical spring 23 surrounds the push rod and has its ends engaged with a keeper 24 on the push rod and a keeper 25 fixed in the bore 22 to urge the push rod against the follower 17 and hold the latter on the cam 15.

The upper end of the connecting rod is bifurcated to define spaced end portions 26 mounted on a divided bearing 27 on the wrist pin 28 to accommodate between these end portions an elongated eye 29 forming the upper end of the push rod 19 as an integral or otherwise fixed part thereof. The wrist pin 28 extends through the eye 29 on the push rod, the elongated slot 30 formed by this eye permitting the required reciprocable and arcuate movement of the push rod relative to the wrist pin.

Opposite side of the eye 29 may as here shown be slidably engaged with the wrist pin to afford a support and bearing for the push rod. The curved upper surface 31 of the eye 29 contacts the lower end of the valve stem 7 as shown in Fig. 1.

It is now apparent that by having the intake valve cam 15 on the crank pin, and the push rod assembly carried by the connecting rod and piston and here provided, I am able to more positively operate the intake valve with a relatively short and straight line transmission of power and a simple and compact mechanism consisting of comparatively few parts, the direction of transmission of power for actuating the valve being axially of the cylinder and piston and doing away with the use of rocker arms and similar motion changing devices.

In accordance with my invention the exhaust port L is formed substantially equal in size to the intake port and axially aligned therewith to insure a uni-directional flow of incoming and exhaust gases. The exhaust valve M is likewise axially aligned with the intake valve and has its stem 32 extended upwardly through the head so as to be operatively associated with the actuating means N. A conventional poppet valve spring 33 is provided for closing the valve M.

The means N for operating the exhaust valve M includes a cam 34 fixed on the journal pin 35 of the crank shaft, a follower 36 supported by the crank shaft bearing bracket 37, a push rod 38, and a conventional rocker arm 39 operated by the push rod on the top of the cylinder head.

Fig. 3 diagrammatically shows a timing of the valves and a cyclical action which is deemed best suited to the engine hereof but of course may be varied to suit the particular engine and circumstances at hand.

Timed as indicated in Fig. 3 the engine will operate so that when the crank pin 16 is in position about 40 degrees before it reaches bottom dead center, the exhaust cam 34 begins to open the exhaust valve M through the operating means N, and when said crank pin is in a position about 40 degrees after it leaves bottom dead center, the exhaust cam 34 ceases the exhaust valve opening operation of the means N. When the crank pin 16 is in a position about 22 degrees before it reaches bottom dead center, the intake cam 15 begins to effect the opening of the intake valve F through the means K and when said pin is in a position about 68 degrees after it leaves bottom dead center the intake cam 15 ceases the valve opening operation of the operating means K for the intake valve.

It is to be noted that it is possible for the exhaust valve M to open prior to the opening of the intake valve F and for said exhaust valve to close prior to the closing of said intake valve, as a decided improvement over two cycle engine heretofore known.

In the operation of the engine as here shown, a combustible charge having reached the combustion chamber G is compressed on the up stroke of the piston and is fired substantially at top dead center.

At a time somewhat before the piston completes its down stroke the exhaust valve M opens and releases the expanding gases through the exhaust port L.

At the time when the escape of exhaust gases has made the chambered pressure thereof equal to or slightly lower than the pressure of the incoming charge, the intake valve F opens and the incoming charge under pressure forces the exhaust gases out of the combustion chamber with the effective scavenging action hereinbefore described.

When most of the exhaust gases have been discharged and yet no appreciable amount of the intake charge has passed out with spent gases, the exhaust valve is closed.

When the pressure of the intake gases in the combustion chamber nearly approaches the pressure in the intake supply ducts, the intake valve F closes and the combustion chamber is sealed for the compression cycle hereinbefore referred to, thereby completing the cycle of the engine in two piston strokes.

It should be noted that the constructions embodied in the engine of my invention readily lend themselves to efficient use in Diesel engines, in which case air would be introduced through the intake port and piston instead of a carbureted mixture.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. In an internal combustion engine, a cylinder having an intake port, a cylinder head having an exhaust port, an exhaust valve controlling said exhaust port, a reciprocal piston in said cylinder provided at its upper end with an intake valve port and a duct leading therefrom and opening through the side of the piston for registration with said intake port, a poppet intake valve carried by the piston for controlling said intake valve port, a crank shaft, a connecting rod between the piston and crank shaft and means operated by the crank shaft for operating said intake and exhaust valves.

2. In an internal combustion engine, a cylinder having an intake port, a cylinder head having an exhaust port, an overhead poppet exhaust valve controlling said exhaust port, a reciprocal piston in said cylinder provided at its upper end with an intake valve port and a duct leading therefrom and opening through a cylinder contacting surface of the piston for registration with said intake port, a poppet intake valve carried by the piston for controlling said intake valve port, a crank shaft, a connecting rod between the piston and crank shaft, means operated by the crank shaft for operating said intake and exhaust valves, including a crank shaft carried cam and push rod means associated with said connecting rod and operated by said cam for actuating said intake valve.

3. In an internal combustion engine, a cylinder having an intake port, a cylinder head having an exhaust port, an overhead poppet exhaust valve controlling said exhaust port, a reciprocal piston in said cylinder provided at its upper end with an intake valve port and a duct leading therefrom and opening through the side of the piston for registration with said intake port, a poppet intake valve carried by the piston for controlling said intake valve port, a crank shaft, a connecting rod between the piston and crank shaft and means for operating said intake and exhaust valves including means embodied in the crank shaft and connecting rod for operating said intake valve.

4. In an internal combustion engine, a cylinder having an intake port, a cylinder head having an exhaust port, an overhead poppet exhaust valve controlling said exhaust port, a reciprocal piston in said cylinder provided at its upper end with an intake valve port and a duct leading therefrom and opening thereon for registration with said intake port, a poppet intake valve carried by the piston for controlling said intake valve port, a crank shaft, a connecting rod between the piston and crank shaft, means operated by the crank shaft for operating said intake and exhaust valves, the means for operating said intake valve, including a cam on the crank pin of said crank shaft, a cam follower carried by the connecting rod, and a push rod associated with the connecting rod and operating between said intake valve and said cam follower for actuating said intake valve, said push rod having a wrist pin embracing yoke for actuating said intake valve.

5. In an internal combustion engine, a cylinder having an intake port, a cylinder head having an exhaust port, an overhead poppet exhaust valve controlling said exhaust port, a reciprocal piston in said cylinder provided at its upper end with an intake valve port and a duct leading therefrom and opening thereon for registration with said intake port, a poppet intake valve carried by the piston for controlling said intake valve port, a crank shaft, a connecting rod between the piston and crank shaft and means operated by the crank shaft for operating said intake and exhaust valves, said piston having a depression centered in its upper end, said intake valve port being centered in said depression and disposed in axially spaced relation to said exhaust port to provide an unidirectional flow of gases in the combustion chamber of said cylinder.

6. In an internal combustion engine, a cylinder having an intake port in a piston-traversed portion thereof, a cylinder head having an exhaust port, an overhead poppet exhaust valve controlling said exhaust port, a reciprocal piston in said cylinder provided at its upper end with an intake valve port and a duct leading therefrom and opening thereon for registration with said intake port, a poppet intake valve carried by the piston for controlling said intake valve port, a crank shaft, a connecting rod between the piston and crank shaft and means operated by the crank shaft for operating said intake and exhaust valves including a cam on the crank shaft, a push rod operated by the cam, and a yoke on the push rod slidably embracing and extending above the wrist pin of the piston and having an upper end for actuating said intake valve.

7. In an internal combustion engine, a cylinder having an intake port, a cylinder head having an exhaust port, an overhead poppet exhaust valve controlling said exhaust port, a reciprocal piston in said cylinder provided at its upper end with an intake valve port and a duct leading therefrom and opening thereon for registration with said intake port, a poppet intake valve carried by the piston for controlling said intake valve port, a crank shaft, a connecting rod between the piston and crank shaft and means operated by the crank shaft for operating said intake and exhaust valves, said intake port including an annular intake duct interiorly of the cylinder for registration with the duct in said piston.

8. In an internal combustion engine, a cylinder having an intake port, a cylinder head having an exhaust port, an overhead poppet exhaust valve controlling said exhaust port, a reciprocal piston in said cylinder provided at its upper end with an intake valve port and a duct leading therefrom and opening thereon for registration with said intake port, a poppet intake valve carried by the piston for controlling said intake valve port, a crank shaft, a connecting rod between the piston and crank shaft and means operated by the crank shaft for operating said intake and exhaust valves, said intake port including an annular intake duct interiorly of the piston, said piston having a circumferential intake duct exteriorly thereof for registry with said annular duct and into which the first named piston duct opens.

9. In an internal combustion engine, a cylinder having an intake port, a cylinder head having an exhaust port, an overhead poppet exhaust valve controlling said exhaust port, a reciprocal piston in said cylinder provided at its upper end with an intake valve port and a duct leading therefrom and opening thereon for registration with said intake port, a poppet intake valve carried by the piston for controlling said intake valve port, a crank shaft, a connecting rod between the piston and crank shaft and means operated by the crank shaft for operating said intake and exhaust valves, said intake port including an annular intake duct interiorly of the piston, said piston having a circumferential intake duct exteriorly thereof for registry with said annular duct and into which the first named piston duct opens, said annular and circumferential intake ducts forming when in full registry an annular chamber of circular cross section and surrounding the piston.

10. An internal combustion engine piston including a piston body of substantially uniform diameter from end to end having an intake valve port at the upper end thereof and an intake duct leading from said port and opening on the side of the piston at a point nearer to the upper than to the lower end of the piston, and an intake poppet valve carried by said piston for controlling said intake valve port, said piston having a circumferentially extended duct on its outer face into which said intake duct opens.

11. An internal combustion engine piston including a piston body having an intake valve port at the upper end thereof and an intake duct leading from said port and opening on the side of the piston and an intake poppet valve carried by said piston for controlling said intake valve port, said piston having a circumferential duct on its outer face into which said intake duct opens.

12. An internal combustion engine piston including a piston body having an intake valve port at the upper end thereof and an intake duct leading from said port and opening on the side of the piston and an intake poppet valve carried by said piston for controlling said intake valve port, said piston having a circumferential duct on its outer face into which said intake duct opens, said piston body having a depression in the upper end thereof in which depression said intake valve port and valve are disposed.

13. An internal combustion engine piston including a piston body having an intake valve port at the upper end thereof and an intake duct leading from said port and opening on the side of the piston and an intake poppet valve carried by said piston for controlling said intake valve port, said piston having a circumferential duct on its outer face into which said intake duct opens, said piston body having a depression in the upper end thereof in which depression said intake valve port and valve are disposed, the wall which defines the depression having an ogee profile.

14. An internal combustion engine piston comprising a piston body having a depression at its upper end and provided in the depression with an intake valve port, there being ducts leading from said valve port, a circumferential duct on said piston body into which said ducts open, an intake valve carried by said body for controlling said intake port, and means whereby said valve may be operated from beneath said valve port and through the piston.

15. In an internal combustion engine, a cylinder having an intake port, a cylinder head having an exhaust port, a piston in said cylinder having an intake valve port at its upper end and a duct leading therefrom and opening on the piston for registry with the intake port in the cylinder, a valve for controlling said exhaust port, a valve for controlling the intake valve port in the piston having a stem extending downwardly therefrom into the exterior of the piston, there being a bore in the piston for slidably receiving said stem, a spring associated with the stem and piston for seating said intake valve, a wrist pin in the piston, a crank shaft, a connecting rod between the wrist pin and crank shaft, a cam on the crank pin of the crank shaft, a cam follower supported by the connecting rod, and a push rod associated with said connecting rod and follower, and a yoke on the push rod slidably embracing the wrist pin and engaged with said valve stem for operating said intake valve.

16. In an internal combustion engine, a cylinder having an intake port, a cylinder head having an exhaust port, a piston in said cylinder having an intake valve port at its upper end and a duct leading therefrom and opening on the piston for registry with the intake port in the cylinder, a valve for controlling said exhaust port, a valve for controlling the intake valve port in the piston having a stem extending downwardly therefrom into the exterior of the piston, there being a bore in the piston for slidably receiving said stem, a spring associated with the stem and piston for seating said intake valve, a wrist pin in the piston, a crank shaft, a connecting rod between the wrist pin and crank shaft, a cam on the crank pin of the crank shaft, a cam follower supported by the connecting rod, and a push rod associated with said connecting rod and wrist pin and engaged at its ends with said follower and said valve stem, said push rod having portions slidably embracing and extending above said wrist pin for engaging said stem and operating said intake valve.

17. In an internal combustion engine, a cylinder having an intake port, a cylinder head having an exhaust port, an exhaust valve controlling said exhaust port, a reciprocal piston in said cylinder provided with an intake valve port and a duct leading therefrom and opening thereon for registration with said intake port, an intake valve carried by the piston for controlling said intake valve port, a crank shaft, a connecting rod between the piston and crank shaft, and means operated by the crank shaft for operating said intake and exhaust valves, said piston having a depression, said intake valve port being located in said depression and disposed in alignment with said exhaust port to provide an unidirectional flow of gases in the combustion chamber of said cylinder.

18. In an internal combustion engine, a cylinder having an intake port, a piston in said cylinder having an intake valve port in its upper end and a duct leading therefrom and opening on the side of the piston for registry with the intake port in the cylinder, a wrist pin in the piston, a crank shaft, a connecting rod having axially spaced bearing portions at its ends mounted on said wrist pin and crank shaft respectively, an intake valve mounted on the piston for controlling the intake valve port and having a stem within the piston, means for actuating said intake valve including a cam on the crank shaft between the spaced bearing portions of the connecting rod, and a push rod means associated with said connecting rod, arranged for actuation by said cam and including a yoke on said rod slidably embracing said wrist pin between the other spaced bearing portions of the connecting rod and having a valve stem engaging portion for operating said intake valve.

19. In an internal combustion engine, a cylinder, a piston therein having an intake valve port, an intake valve carried by the piston for controlling said port, a crank shaft, a connecting rod between said piston and crank shaft, a cam on said crank shaft, said connecting rod having an axial bore, a cam follower slidably supported in said bore and contacting said cam, and a push rod carried by said connecting rod and abutting said follower, and a yoke on said push rod embracing the connection of said rod with the piston and contacting and operating said valve.

20. In an internal combustion engine, a cylinder, a piston therein having an intake valve port, an intake valve carried by said piston for controlling said port, a crank shaft, a connecting rod between the crank shaft and said piston, and crank shaft operated means, for actuating said valve, including a push rod carried by the connecting rod, a cam on the crank shaft, a follower carried by the connecting rod and having its ends abutting said cam and an end of said push rod, and a spring mounted in said connecting rod and surrounding and urging said push rod against said follower.

OWEN R. HUGHES.